(No Model.) 3 Sheets—Sheet 1.
W. GRISCOM, T. McFEELY & E. T. BUTLER.
ROLLER MILL.
No. 325,601. Patented Sept. 1, 1885.
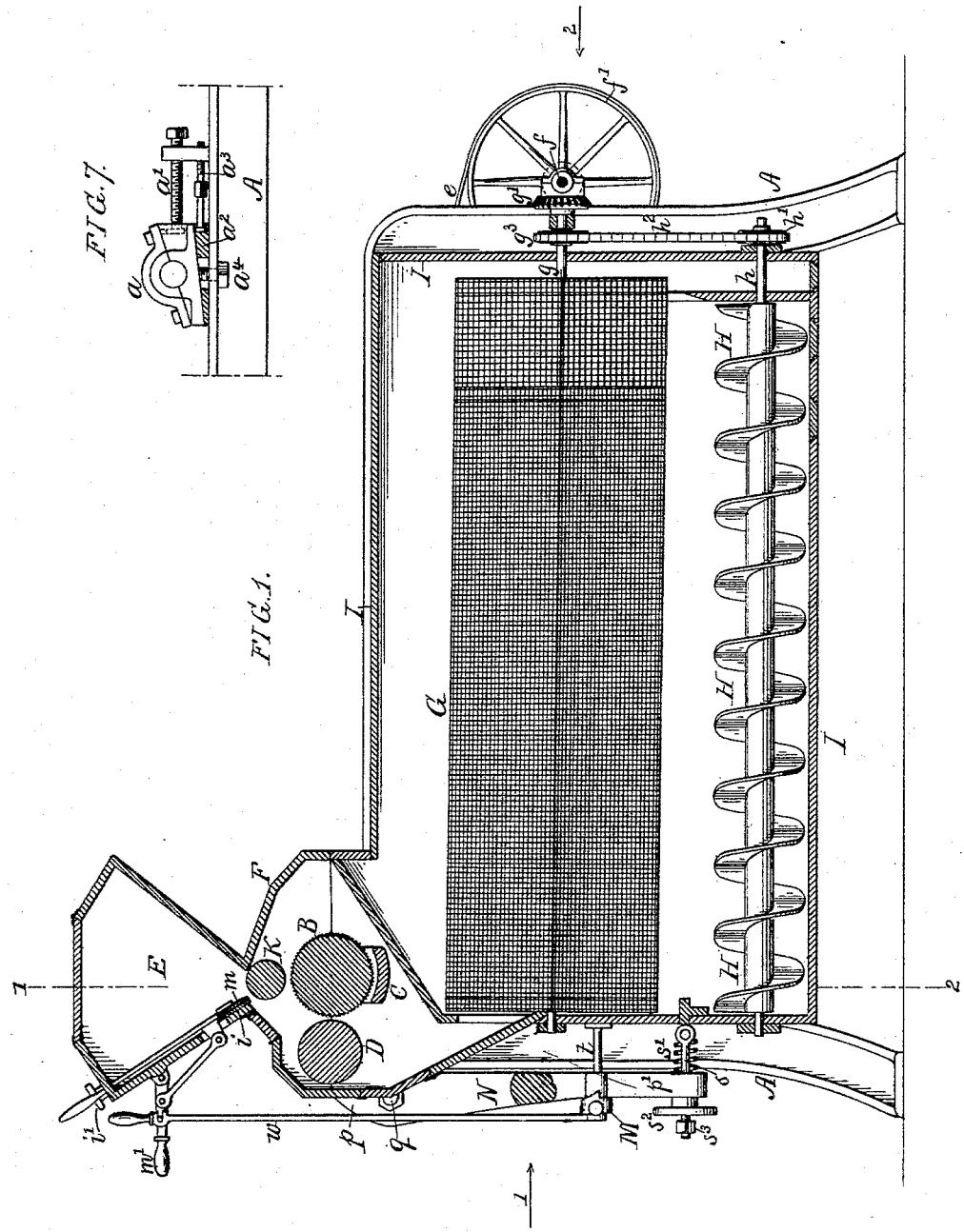
WITNESSES:
Harry L. Ashenfelter
James T. Tobin
INVENTORS
Walter Griscom
Thomas McFeely
and Eli T. Butler
by their Attorneys
Howson & Sons

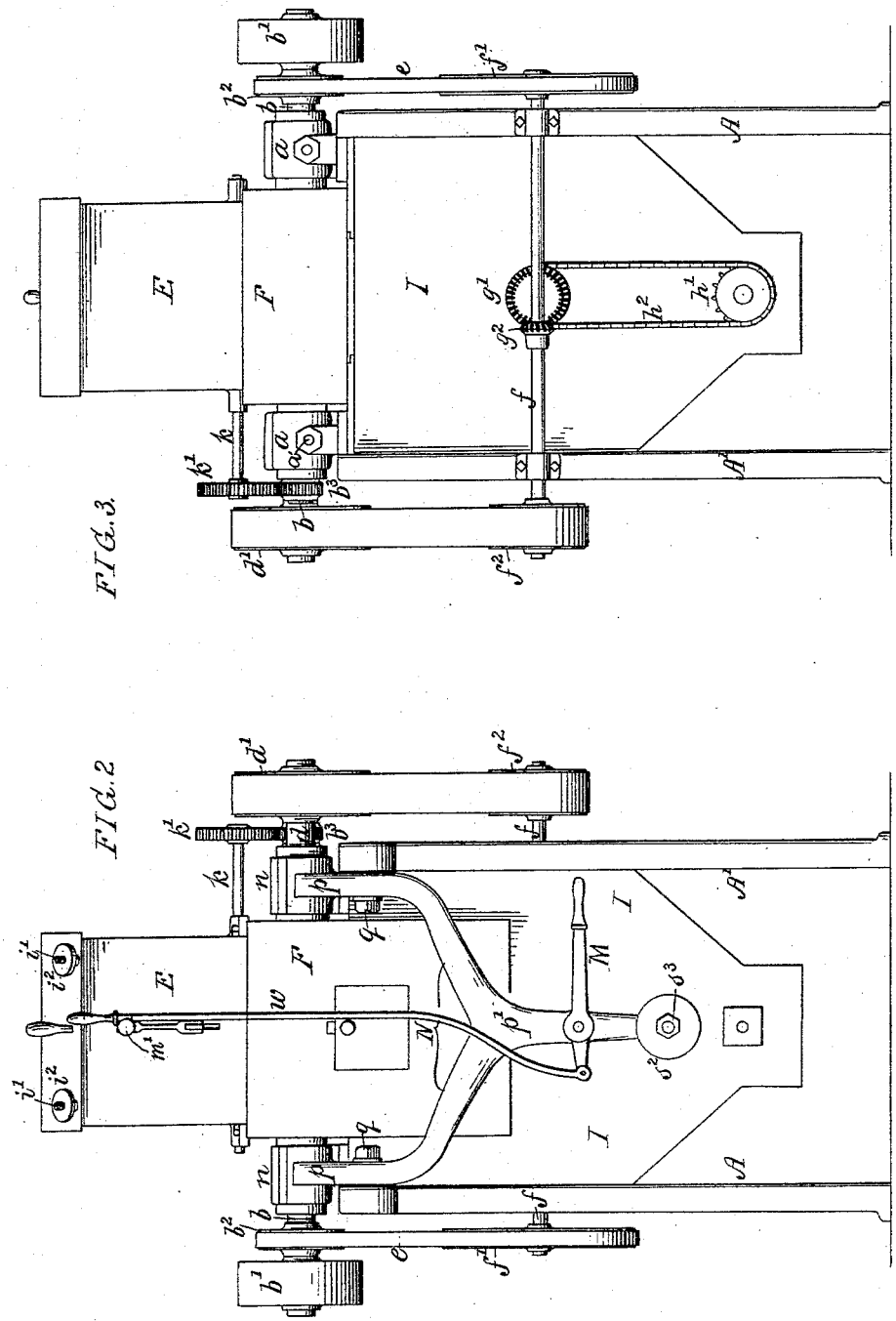

(No Model.) 3 Sheets—Sheet 3.
W. GRISCOM, T. McFEELY & E. T. BUTLER.
ROLLER MILL.
No. 325,601. Patented Sept. 1, 1885.
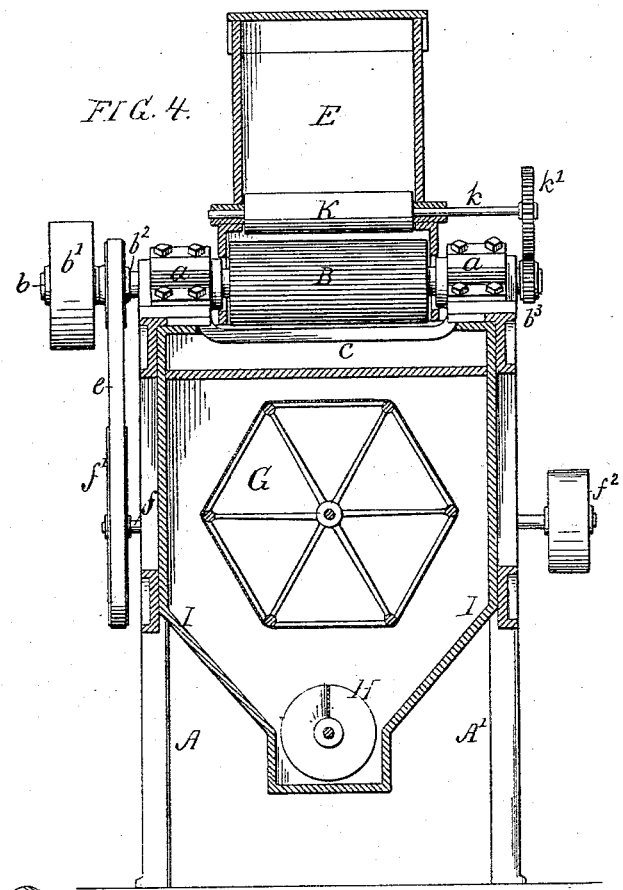
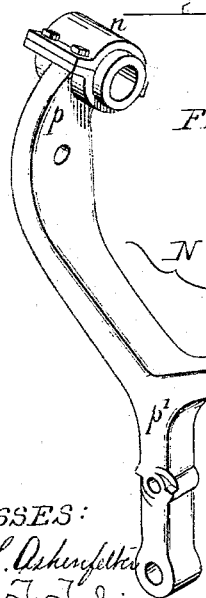
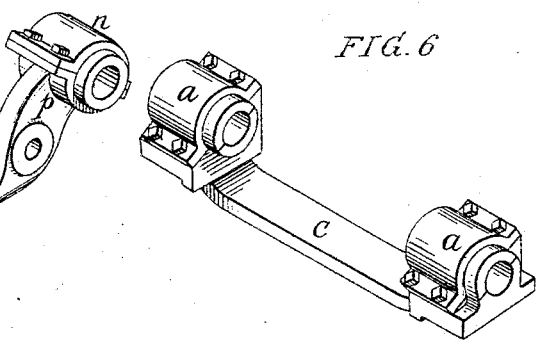
WITNESSES:
Harry L. Ashenfelter
James T. Tobin
INVENTORS
Walter Griscom
Thomas McFeely
and Eli T. Butler
by their Attorneys
Howson & Sons

UNITED STATES PATENT OFFICE.

WALTER GRISCOM, OF PHILADELPHIA, PENNSYLVANIA, THOMAS McFEELY, OF ALEXANDRIA COUNTY, VIRGINIA, AND ELI T. BUTLER, OF HAMILTON, OHIO, ASSIGNORS TO SAID GRISCOM AND McFEELY, AND SAMUEL E. GRISCOM, OF PHILADELPHIA, PENNSYLVANIA.

ROLLER-MILL.

SPECIFICATION forming part of Letters Patent No. 325,601, dated September 1, 1885.

Application filed June 26, 1883. (No model.)

*To all whom it may concern:*

Be it known that we, WALTER GRISCOM, THOMAS McFEELY, and ELI T. BUTLER, citizens of the United States, and residing, said GRISCOM in Philadelphia, Pennsylvania, said McFEELY in Alexandria county, Virginia, and said BUTLER in Hamilton, Ohio, have invented certain Improvements in Roller-Mills, of which the following is a specification.

Our invention consists of certain improvements in devices for adjusting the roller-bearings and in gearing for driving a separator and conveyer with which the mill is combined, the nature of our improvements being too fully set forth hereinafter to need preliminary explanation.

In the accompanying drawings, Figure 1, Sheet 1, is a longitudinal section of the mill; Fig. 2, Sheet 2, a view of the end of the same looking in the direction of the arrow 1; Fig. 3, an end view looking in the direction of the arrow 2; Fig. 4, Sheet 3, a transverse section on the line 1 2, Fig. 1; Figs. 5 and 6, perspective views of the roller-bearings; and Fig. 7, Sheet 1, a detached view showing the adjusting devices for one of the roller-bearings.

A A' are the opposite side frames of the mill; B, the fixed roller; D, the adjustable roller; E, the hopper; F, the roller-box; G, the separator; H, the conveyer, and I the casing for said separator and conveyer. The shaft $b$ of the roller B is adapted to bearings $a$ $a$, which can be adjusted longitudinally on the frame A by means of set-screws $a'$ and vertically by means of wedges $a^2$, the latter being under control of threaded bolts $a^3$, and the boxes being secured in position after adjustment by vertical bolts $a^4$. (See Fig. 7.)

The bearings $a$ $a$ are rigidly connected by a transverse bar, $c$, preferably cast with the lower halves of the boxes, so that while independent adjustment of the boxes is not interfered with the axes of the two bearings must necessarily be parallel with each other and with the axis of the roller at all times; hence uneven wear on the journals due to improper setting of the boxes by an unskillful attendant is prevented. The boxes $a$ and transverse bar $c$, however, form a rigid self-contained structure for carrying the roller B, corresponding in effect to the rigid forked lever carrying the roller D, as described hereinafter.

The shaft $b$ projects beyond the bearings $a$, and is furnished with pulleys $b'$ $b^2$ and a pinion, $b^3$. The pulley $b'$ receives a belt from a pulley on any adjacent power-driven countershaft, and the pulley $b^2$ drives, by means of a belt, $e$, a pulley, $f'$, on a shaft, $f$, adapted to bearings at the rear end of the machine, this shaft having at the opposite end a pulley, $f^2$, a belt from which passes round a pulley, $d'$, on the shaft $d$ of the adjustable roller D of the mill. The pulleys $b^2$, $f'$, $f^2$, and $d'$ are so proportioned that the roller B will turn from four to six times as fast as the roller D.

On the shaft $f$ is a bevel-pinion, $g^2$, which gears into a bevel-wheel, $g'$, on the shaft $g$ of the separator G; and on said shaft $g$ is also a chain-wheel, $g^3$, a belt, $h^2$, from which drives a chain-wheel, $h'$, on the shaft $h$ of the conveyer H.

The separator and conveyer are of ordinary construction, and hence need not be specifically described, the only feature of this part of our invention being the gearing for driving these parts.

The pinion $b^3$ of the shaft $b$ drives a spur-wheel, $k'$, on the spindle $k$ of a roll, K, which partially closes the discharge-opening of the hopper E, and serves, in connection with an adjustable valve, $i$, to regulate the feeding of the grain to the rollers B and D. The valve $i$ has screw-rods $i'$ passing through the top of the hopper and provided with adjusting-nuts $i^2$, as shown in Figs. 1 and 2.

A cut-off valve, $m$, is arranged to slide on the valve $i$, so that by depressing this valve $m$ until it comes in contact with the roller K the flow of grain will be cut off. The valve is controlled by an arm, $m'$, pivoted to the hopper and connected by a link to a stud on the valve, and this arm is operated as described hereinafter.

The bearings $n$ for the shaft $d$ of the roll D form part of the short arms $p$ of a forked lever, N, which is hung by bolts $q$ to the frames A A′ of the mill, the long arm $p'$ of the lever being under control of adjusting devices shown in Figs. 1 and 2. The lower end of said arm $p'$ has an opening for the reception of the stem of a pivoted bolt, $s$, surrounding which and bearing against the inner side of the arm is a spring, $s'$, the tendency of the latter being to thrust the arm $p'$ outward and press the roller D toward the roller B. This approach is limited, however, by a nut, $s^2$, adapted to the threaded stem of the bolt $s$, and bearing on the outer face of the arm $p'$, so that by properly adjusting said nut the space between the rollers may be increased or diminished, as desired.

A jam-nut, $s^3$, is adapted to the bolt $s$ outside of the nut $s^2$, this nut $s^3$ being so adjusted that the nut $s^2$ cannot be retracted to such an extent as to permit contact of the rollers B and D.

It is necessary to provide for a quick separation of the rollers without interfering with the set of the same, as determined by the adjustment of the nut $s^2$. For this purpose we use a cam-lever, M, bearing on the arm $p'$ of the lever N just above the adjusting-nut $s^2$, this lever being hung to a rod, $t$, projecting from the casing I. By turning the lever on the rod the cam will act upon the arm $p'$ of the lever so as to depress the same and draw the roller D away from the roller B, the parts being restored to their former position by the spring $s'$ when the lever is reversed.

In order to cut off the flow of grain to the rollers when the latter are separated, the arm $m'$ of the cut-off valve $m$ is connected by a rod, $w$, to the lever M, whereby, on the operation of the latter to draw back the roller D, the valve $m$ will be closed, the reverse movement of the lever effecting the opening of the valve. As the cam-lever M acts upon the lever N at a point away from the adjusting-screw, the operation of said lever cannot affect the proper set of the rollers, as it is likely to do when it acts upon the adjusting-nut.

It will be observed that the fixed roller has longitudinal teeth or corrugations parallel with the axis of the roller, and that the roller D is plain and less in diameter than the roller B. The combination of a toothed and plain roller we have found in practice to give the best results in cracking or breaking the grain-kernels without crushing the same, and the decrease in the diameter of the small roller permits the grains to approach at once the point where they are subjected to the full effect of the rollers without having to first traverse a gradually-tapering passage of considerable extent, as when the rolls are of the same diameter.

The object of providing the roller B with longitudinal corrugations is to cause or tend to cause the grains of wheat to arrange themselves lengthwise before being subjected to the cracking influence of the rolls, the splitting of the grains being easily effected by pressure exerted upon them when in this position, and there being less tendency of the rollers to cut or chop the grains than when the latter are presented in any other position.

We claim as our invention—

1. The combination of the roller D of the mill and the opposite boxes $a\,a$, forming bearings therefor, and rigidly connected by a transverse bar, $c$, with the adjusting-screws, wedges, and locking-bolts for said bearings, as set forth.

2. The combination of the roller-shaft $b$, the separator and conveyer shafts $g$ and $h$, the counter-shaft $f$, driven from the roller-shaft, bevel-gearing connecting said counter-shaft and the separator-shaft, and chain-gearing connecting the separator and conveyer shafts, as set forth.

In testimony whereof we have signed our names to this specification in the presence of two subscribing witnesses.

WALTER GRISCOM.
THOS. McFEELY.
ELI T. BUTLER.

Witnesses:
HARRY L. ASHENFELTER,
HARRY SMITH.